United States Patent
Kumar et al.

(10) Patent No.: US 10,341,321 B2
(45) Date of Patent: Jul. 2, 2019

(54) SYSTEM AND METHOD FOR POLICY BASED ADAPTIVE APPLICATION CAPABILITY MANAGEMENT AND DEVICE ATTESTATION

(71) Applicant: Mocana Corporation, San Francisco, CA (US)

(72) Inventors: Srinivas Kumar, Cupertino, CA (US); Celena Tanguay, Oakland, CA (US); Steven Darrel Burnett, Millbrae, CA (US)

(73) Assignee: MOCANA CORPORATION, Sunnyvale, CA (US)

( * ) Notice: Subject to any disclaimer, the term of this patent is extended or adjusted under 35 U.S.C. 154(b) by 164 days.

(21) Appl. No.: 15/390,874

(22) Filed: Dec. 27, 2016

(65) Prior Publication Data

US 2018/0109538 A1    Apr. 19, 2018

Related U.S. Application Data

(60) Provisional application No. 62/409,334, filed on Oct. 17, 2016.

(51) Int. Cl.
*H04L 29/06* (2006.01)

(52) U.S. Cl.
CPC .......... *H04L 63/08* (2013.01); *H04L 63/0823* (2013.01); *H04L 63/10* (2013.01); *H04L 63/20* (2013.01)

(58) Field of Classification Search
CPC ......... H04L 63/08; H04L 63/10; H04L 63/20; H04L 63/0823

(Continued)

(56) References Cited

U.S. PATENT DOCUMENTS 5,841,869 A     11/1998  Merkling et al.
7,207,041 B2 *  4/2007   Elson ................... G06F 9/5011
                                                        718/1

(Continued)

OTHER PUBLICATIONS

Chadwick, David W. et al., "The PERMIS X.509 Role Based Privilege Management Infrastructure", Future Generation Computer Systems. 936, Retrieved from the Internet: sec.cs.kent.ac.uk/download/FutureGenCompSyst.pdf, Dec. 2002, 13 pgs.

(Continued)

*Primary Examiner* — Hosuk Song
(74) *Attorney, Agent, or Firm* — Buchanan Ingersoll & Rooney PC

(57) ABSTRACT

A method provides policy based adaptive application capability management and device attestation for dynamic control of remote device operations. The method includes instrumenting applications installed on a remote device to examine their runtime application programming interface (API) invocations to trusted functions abstracted by a trusted services platform anchored to an underlying firmware, software or hardware root of trust, and managing the application security operations based on the execution context and dynamic privilege controls to restrict their capabilities. The invention also provides a local attestation agent to perform state measurements for platform trust, configuration and operational metrics, and generates device policy based platform and application level alerts. These alerts allow operations technology (OT) administrators to dynamically control the operational capabilities of applications, to deal with discovered vulnerabilities and exploits, before requiring distribution of application software upgrades or patches onto a large number of distributed remote devices.

19 Claims, 9 Drawing Sheets

(58) Field of Classification Search
USPC ............... 726/1–6, 27–30; 713/168, 173
See application file for complete search history.

(56) References Cited

U.S. PATENT DOCUMENTS

| | | | |
|---|---|---|---|
| 7,328,259 B2 | 2/2008 | Srinivasan et al. | |
| 7,512,965 B1 * | 3/2009 | Amdur | H04L 63/20 726/1 |
| 7,870,399 B2 | 1/2011 | Bryant et al. | |
| 8,327,441 B2 | 12/2012 | Kumar et al. | |
| 8,839,363 B2 | 9/2014 | Spiers et al. | |
| 8,843,997 B1 | 9/2014 | Hare | |
| 8,898,746 B2 * | 11/2014 | Gregg | H04L 63/10 726/29 |
| 9,015,482 B2 * | 4/2015 | Baghdasaryan | H04L 9/3271 713/168 |
| 9,043,480 B2 | 5/2015 | Barton et al. | |
| 9,143,976 B2 | 9/2015 | Raleigh et al. | |
| 9,172,687 B2 * | 10/2015 | Baghdasaryan | H04L 63/08 |
| 9,424,421 B2 | 8/2016 | Aissi et al. | |
| 2005/0081055 A1 | 4/2005 | Patrick et al. | |
| 2013/0179991 A1 | 7/2013 | White et al. | |
| 2016/0283402 A1 | 9/2016 | Schulz et al. | |

OTHER PUBLICATIONS

N. Asokan et al., "Mobile Platform Security", Aalto University and University of Helsinki Summer School, Retrieved from the Internet: http://asokan.org/asokan/Padova2014/tutorial-mobileplatsec.pdf, 2014, 122 pgs.

Gonzalez, Javier, "Operating System Support for Run-Time Security with a Trusted Execution Environment", Ph.D Thesis, IT University of Copenhagen, Jan. 31, 2015, 194 pgs.

Gu, Liang et al., "Security model oriented attestation on dynamically reconfigurable component-based systems", Journal of Network and Computer Applications, Retrieved from the Internet: http://sei.pku.edu.cn/~yaoguo/papers/Gu-JNCA-11.pdf, 2011, 8 pgs.

Wendt, Jeremy D. et al., "Trusted Computing Technologies, Intel Trusted Execution Technology", Sandia National Laboratories, United States Department of Energy, Jan. 2011, 35 pgs.

Xu et al., "A Policy Enforcing Mechanism for Trusted Ad Hoc Networks", Abstract, 2011, 1 pg.

Xu, "Trusted Application Centric Ad hoc Network", Abstract, 2008, 1 pg.

\* cited by examiner

SYSTEM AND METHOD FOR POLICY BASED ADAPTIVE APPLICATION CAPABILITY MANAGEMENT AND DEVICE ATTESTATION

CROSS-REFERENCE TO RELATED APPLICATIONS

This application claims the benefit under 35 U.S.C. § 119(e) of U.S. Provisional Patent Application No. 62/409,334, entitled "SYSTEM AND METHOD FOR POLICY BASED ADAPTIVE APPLICATION CAPABILITY MANAGEMENT AND DEVICE ATTESTATION" filed on Oct. 17, 2016, which is incorporated herein by reference in its entirety for all purposes.

BACKGROUND OF THE DISCLOSURE

Field of the Disclosure

This invention relates generally to software and network security. More specifically, it relates to the field of cyber security and the industrial Internet of Things.

Description of Related Art

Today state of the art Information Technology (IT) is driven by security and compliance requirements powered by threat intelligence to manage user devices. The primary risk is theft of intellectual property, such as classified documents or sensitive client information (e.g. name, address, email, password, social security number). The threat intelligence is typically available as remotely sourced indicators of compromise. Security countermeasures are provided by means of a local policy engine (for example, antivirus or host based intrusion detection).

Contrary to IT, operations technology (OT) is driven by safety and resiliency considerations for anticipation and preemption of undesirable outcomes. Devices in the IIoT sector are unmanaged headless (i.e. no interactive user) special purpose appliances. The risks posed include mission critical disruption of services and loss of human life and/or property. The threats are sourced locally on a platform instrumented for trust measurements and require a remote policy engine for intervention and remediation.

Applications developed for deployment on remote IoT devices perform a plurality of security functions. These may require use of security modules (hardware, firmware or software based root of trust), cryptographic algorithms, encryption keys for confidentiality, signing keys and hash functions for integrity, and certificates for authoritative identification and attestation. As new vulnerabilities and exploits are discovered, application developers need to modify the code and publish upgrades for applications deployed on a large number of geographically distributed remote devices. Process and forensic analysis of safety incidents introduce delays that impact the time to remediate and preempt threats on such devices. A single compromised device can cause undesirable consequences.

A static (tight) coupling of applications to a plurality of security modules makes it harder to intervene quickly. A dynamic (loose) coupling of applications through a service abstraction layer managed by remotely configurable device policies simplifies application management with granular privilege controls based on trusted operational state measurements and local attestation.

Some of the current approaches use policy engines that generate device specific context and state based on static configuration, process and/or file signatures. Policies for application management evaluate data transfers, data sharing, inter-process communications, and remote procedure calls between applications to control access to a resource. Based on the evaluation, the API call may be authorized or blocked. The policy file may further include boot sequence integrity verification measurements, system health measurements, runtime restrictions, licensing information and cryptographic keys (for example, encrypted private and symmetric keys). The contextual information may include hardware and software detectable context information related to data provenance, local resources (on the device), network activities and application usage (for example, processor, memory, users, connections). A modification action in response to policy violation may include activation, deactivation or migration of the application instance on or across a device (i.e. operating platform).

Other methods typically leverage trusted code zones and trusted execution environments provided by processor architectures (such as, for example, Trusted Computing Group (TCG) Trusted Platform Module (TPM), ARM TrustZone™, Trusted Execution Environment (TEE), Intel® Software Guard Extension (SGX), Subscriber Identification Module (SIM) card). The data and code executing within the trusted zone are tamper-proof.

Certain aspect oriented programming methods and techniques wrap existing APIs with security controls without modifying the internal logic of the APIs. Other methods create an anti-tamper security wrapper around an existing application and insert a security service provider at the entry point to monitor the application and provide core services. These techniques are based on interception of API calls by injected or wrapper code that operates to allow or block the application's API calls based on a security policy.

Common attestation methods rely on trusted measurements of binaries and configuration, and a set of platform configuration registers (PCRs), managed by a Trusted Platform Module (TPM) serving as the hardware root of trust. The registers may be extended (unsealed and resealed) to include the boot configuration of a virtual machine (VM) hosted on the virtualization platform. Such a measured launch environment is limited to boot time measurements of the virtualization platform and does not extend to guest workloads (namely the plurality of virtual machines hosted on the virtualization platform). Remote attestation of the virtualization platform is performed by requesting a quote of the PCRs signed by the TPM. The PCRs are limited to boot configuration and the initial load sequence, and do not measure runtime integrity of applications loaded into an entrusted or trusted execution environment (such as for example within a container or guest VM).

Certain approaches provide an adaptation layer to tie a framework layer and a services layer to a runtime environment. The framework programming interface (FPI) translates API invocations into one or more service programming interface (SPI) invocations. The FPI layer hides the SPI from the adaptation layer to prevent any dependencies on the SPI layer or dynamically configurable plug-in service provider modules. Each service provider may enforce its own authentication and authorization policy. The adaptation layer, therefore, cannot provide policy-based management of SPI invocations.

Certain other approaches for computing devices (e.g. mobile phones) use techniques that implement a security engine (with a callable interface—e.g. API) to dynamically enumerate security capabilities of available service providers (e.g. a secure operating environment and/or the computing device). A request received from an application may indicate criteria for a security service based on a desired level of security, sensitivity of data, type of operation or a security policy. A security decision engine compares and selects the appropriate security provider based on the security capabilities required for the security service. Such approaches merely direct the application request to a security capability based on criteria in the security policy to choose a security service to be rendered to the application. The response to the application indicates outcome as either an acknowledgement of the request or an enablement of the requested security service.

The Trusted Execution Engine(s) powered by processor architectures such as TPM and ARM TrustZone partition the platform into untrusted and trusted environments. Some approaches propose monitoring the untrusted and trusted applications using a reference monitor to pre-evaluate actions through a policy decision logic for secure operation. However, such approaches require a fail proof mechanism that prevents the applications from bypassing the reference monitor and/or the policy decision engine, and further the ability to enforce the action directives external to the application.

Commonly available types of IoT application Software Development Kit (SDK) are intended for rapid development of applications on IoT devices (e.g. sensors, gateways, mobile devices) for integrated services on cloud platforms provide rules engines and policy grammar for applications on the device to send alerts and messages to remote analytics engines. These policies are designed for event notifications based on patterns and thresholds associated with the application's specific features and capabilities, such as for example, temperature measurement, monitoring use of electricity or water, motion detector, video surveillance, monitoring assets or production, fleet management, etc.

SUMMARY OF THE DISCLOSURE

The disclosed system and method provides post authorization risk management controls provisioned dynamically by the device owner and enforced by an underlying trusted services platform module, at runtime, during invocation of the application programming interface by a plurality of applications executing on the device.

Applications designed to operate on consumer and commercial end-user devices such as, for example, smartphones, tablets and laptops may be delivered through a trusted application store hosted by the vendor (e.g. Apple, Google, Microsoft, Amazon App Stores). These applications are compatible with vendor specific platforms (e.g. Apple iOS, Andriod, Microsoft Windows™). In sharp contrast, IIoT applications designed for gateway and cloud (edge) platforms are required to support a wide variety of sensors (e.g. remote terminal units (RTUs), supervisory control and data acquisition systems (SCADA) controllers, programmable logic controllers (PLCs), analog sensors and actuators, ancillary devices, etc.) on a variety of platforms (hardware operating environments and software stacks). This requires IIoT applications to be adaptive and platform agnostic to integrate with the capabilities of any underlying platform and vendor. For these types of use cases, a trusted services platform is required to provide an abstraction layer for applications to integrate dynamically with platform capabilities related to key and certificate management—for device identification, device enrollment, remote provisioning, device management, cryptographic operations, secure communications, secure transport, and secure storage.

Applications' use of a specific secure method (e.g. type of cipher, key length, key strength, hash digest) cannot be detected and regulated in real time by a network firewall, security gateway or an intrusion detection/prevention system. Revoking a privilege previously granted to an application during the compile and link stage requires a built-in dynamic runtime control over the security operation or associated library function.

Applications purpose built for IIoT devices with a plurality of capabilities must operate on multiple platforms (processors, operating systems) and across multiple vendor chipsets. Different platforms provide a variety of security modules as a firmware, software or hardware based root of trust. As vulnerabilities and exploits surface, cipher algorithms, key lengths, key strengths, and hash types evolve. This poses a support, sustenance and interoperability challenge for OT administrators and field operators because upgrading in-service legacy applications and devices is cumbersome. Providing an API to application developers for defensive programming enables applications to (a) anticipate deployment on a variety of platforms and operating environments and, (b) augment pre and post authorization controls. For example, an application may support the Secure Hash Algorithm (SHA) version 1 (SHA-1) and version 2 (SHA-2) capabilities as the hash type, but may be directed to use only SHA-1 on a Trusted Platform Module (TPM) version 1.2 platform and only SHA-2 on a TPM version 2.0 platform.

A plurality of applications register a security descriptor with authentication and authorization attributes to access the APIs provided by a Trusted Services Platform (TSP) module. The authentication attributes may include the credentials required as proof of ownership (for example—user or private key password) of the root of trust security module. The authorization attributes may include identifiers to verify the signature and integrity of the application image and application security context (for example—cipher algorithm, key type, key size, hash type). The trusted services platform enforces the device policy based on the security descriptor and the application security context.

In one embodiment, the method uses a policy scheme that granularly specifies actions based on a dynamic attribute value assessment at runtime. The control directive may block or permit the application's operation or generate a warning (alert). The application may now be designed such that it could anticipate such an outcome during a Trusted Services Platform API invocation and accordingly adapt to use of alternate security capabilities.

As an example, an application may be compiled to use SHA-1 or SHA-2 hash functions. A policy may dictate restriction on use of the SHA-1 hash function. The application may automatically adapt and use the SHA-2 hash function instead. As another example, an application may be compiled to use 80-bit or 112-bit symmetric key algorithms. A policy may dictate restriction on use of 80-bit symmetric keys. The application may automatically adapt and use a 112-bit symmetric key algorithm instead.

In another embodiment, the method abstracts applications from a diversity of security modules (multi vendor, multi platform) and exposes a normalized application programming interface that is agnostic to the underlying root of trust platform architecture.

BRIEF DESCRIPTION OF THE DRAWING FIGURES

The disclosure is best understood from the following detailed description when read in connection with the accompanying drawings. According to common practice, various features/elements of the drawings may not be drawn to scale. Common numerical references represent like features/elements. The following figures are included in the drawings.

Figure 1:
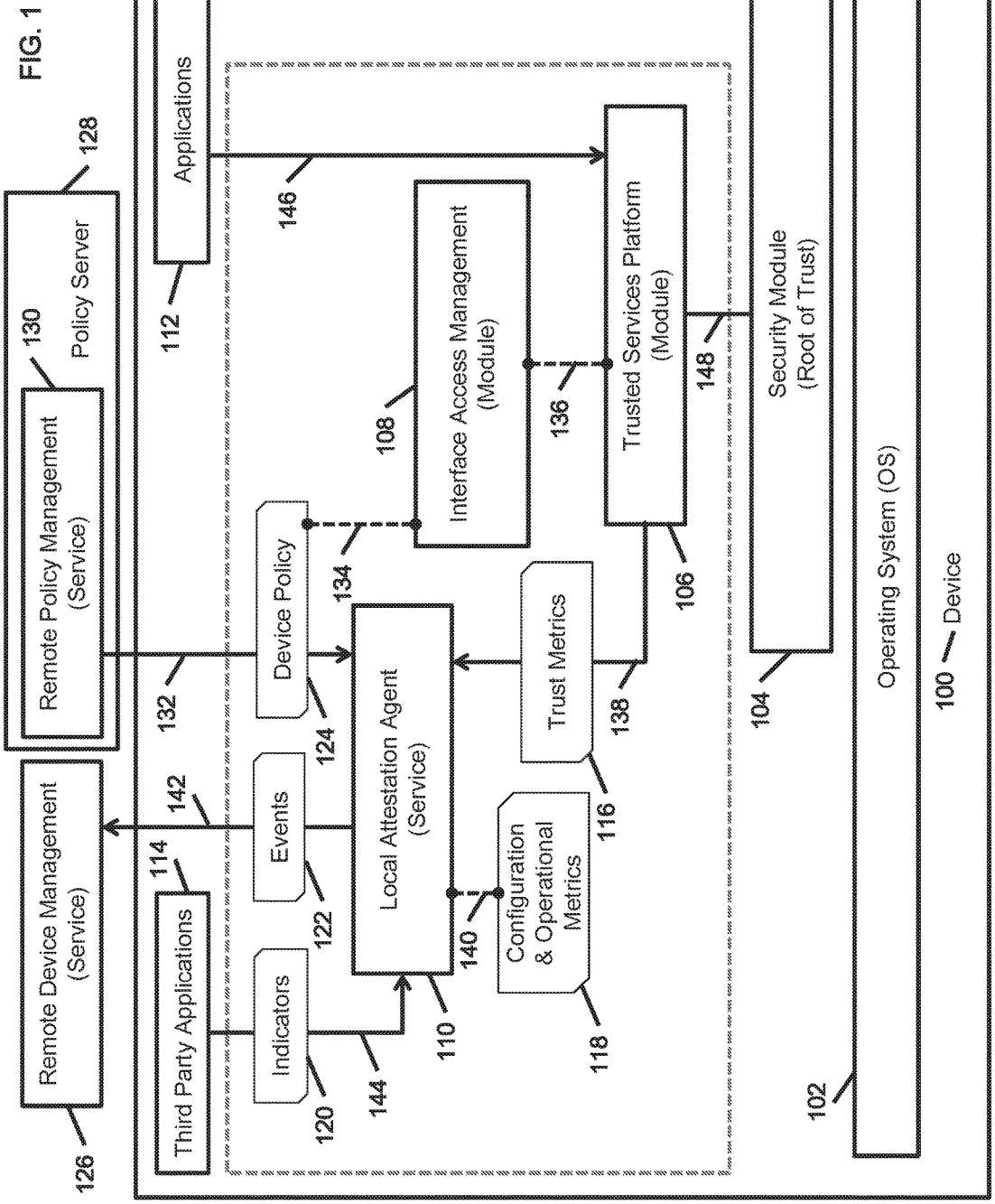
FIG. 1 is a schematic diagram illustrating a method of policy based adaptive application capability management in accordance with various exemplary embodiments of the disclosed system.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Although the disclosure is illustrated and described herein with reference to specific embodiments, the invention is not intended to be limited to the details shown herein. Rather, various modifications may be made in the details within the scope and range of equivalents of the claims and without departing from the scope of the disclosure.

A root of trust (RoT) anchor may be implemented in firmware (ROM), software (flash, RAM) or hardware (ancillary processor or co-processor). The primary capability a root of trust provides to attestation of keying materials (branches) emerging from the root. The keying materials are made operational by applications (leaves) on the basis of "explicit" trust derived from the trust chain.

Once the applications are loaded into memory and commence execution, the trustworthiness of the platform is a function of in-process integrity of operations in memory (RAM). The exposure at execution time comes from an application's vulnerabilities (e.g. buffer overflow, privilege escalation, code injection, brute force or side channel attacks) and exposures to an attacker (e.g. protocol or API based exploit staging surface, co-resident attacker in a multi-tenancy). This phase of trustworthiness requires a trusted execution environment to camouflage the unencrypted code and data in memory and prevent unintended pathways in the call flow graph.

End to end trust requires continuous and verifiable metrics on (a) data at rest, (b) data in process and (c) data in motion. Data at rest may be protected with symmetric key encryption wherein a protected primary seed and key derivation function dynamically regenerates the symmetric key. Data in process requires secure key operations wherein the private key never leaves the chip in the clear. Data in motion requires confidentiality (encryption based on a one-time session key), integrity (signed message digest) and authenticity (certificate based device identification). Fundamental to the notion of a root of trust is the plurality of technologies necessary to build the end-to-end chain of trust.

In sharp contrast with information technology (IT) where threat vectors are categorized as security incidents to detect intrusions and data breaches, operations technology (OT) requires threats to be profiled as safety incidents to prevent loss of human life or damage to mission critical systems. Therefore, the intrinsic nature of safety policies for a headless (no user) device in the OT realm differs from security policies for networks and user endpoints in the IT realm.

The system and method comprises of a Local Attestation Agent (LAA) service, a Trusted Services Platform (TSP) module, and an Interface Access Management (IAM) module on the remote device. The device includes one or more security modules to establish a root of trust. The security module may be a hardware, software or firmware component (e.g. Trusted Computing Group (TCG) Trusted Platform Module (TPM), Trusted Execution Environment (TEE), Virtual TPM, Intel® Software Guard Extension (SGX), Intel® Enhanced Privacy ID (EPID), SIM card based on Java Card technology, etc.). The security module provides a set of trusted functions that execute in a trusted execution environment of the central processing unit (CPU) or a co-processor on the device.

While each security module may provide a specific set of trusted functions, such as for example device identification, key generation, encrypt, decrypt, sign and verify operations, multiple security modules may provide alternate embodiments of a trusted function.

The applications installed on the device may be compiled and linked (statically or dynamically) to the TSP module and may at runtime invoke the TSP API to perform security operations. The security operations include, for example, key generation, data encryption, data decryption, signing messages, and verifying messages.

Further, the applications installed on the device may be designed to offer a plurality of capabilities for confidentiality and integrity of data transfers and safety countermeasures against vulnerabilities (e.g. buffer overflow, privilege escalation, code injection, brute force or side channel attacks) and exposures to an attacker (e.g. protocol or API based exploit staging surface, co-resident attacker in a multi-tenancy). For interoperability, applications may be designed to negotiate keying materials (e.g. cipher algorithms, key sizes, hash types, certificate signing request (CSR) attributes) with peers in a service transaction over the network.

The LAA receives device (e.g. trusted boot) and application (e.g. code signing) trust metrics from the TSP module, and indicators (e.g. safety threats, behavior patterns, anomalies, machine learning) from third party applications installed on the device. The LAA examines device configuration and monitors operations to generate local metrics for inference of device status based on device policy for remote device management. The LAA exposes APIs via a library module for third party applications to send the indicators to Security Information and Event Management (SIEM) services. The LAA also exposes APIs via a library module for a Simple Network Management Protocol (SNMP) client on the device to receive state measurements and alerts to notify a SNMP receiver.

A Third Party Application (TPA) may perform application and/or device monitoring based on pattern recognition techniques to generate indicators of safety threats, behavior patterns, anomalies and machine learning.

The device policy includes platform and application specific policies. The LAA generates synchronous platform policy alerts based on state measurements, received indicators from third party applications, and received asynchronous application policy alerts from the TSP based on application operation requests. The alerts signify policy violations based on the device policy.

The LAA generates event log messages based on the triggered alerts. The logs are formatted in an industry standard log format (e.g. Common Event Format—CEF) and dispatched to a remote device management service. This remote service may be configured to operate as a SIEM service and receive, archive, parse and analyze CEF logs for analytics. The LAA may also use connectors to forward the events to an orchestration service (e.g. McAfee Enterprise Policy Orchestrator—ePO, Splunk etc.) based on the published message format and protocol for data providers.

Device policies are created by a remote policy management service at a policy server through an administrative user interface (e.g. web portal), and transported using an industry standard extensible specification (e.g. Structured Threat Information eXpression—STIX) and message format (e.g. JavaScript Object Notation—JSON). The LAA on a remote device requests, and subsequently receives, the device policy from the policy server. The device policy is digitally signed using the private key (of an asymmetric key pair) of the policy server along with a keyed hash digest (verifiable on the device by a root of trust).

Table 1 provides sample illustrations of structured expressions based on action type, state measurements and received indicators.

TABLE 1

Device Policy Scheme

| Attribute | Action Type(s) | Value (Examples) |
|---|---|---|
| Cipher Algorithm | Restrict, Warn | 3DES, DSA |
| Key Hash | Restrict, Warn | MD5 |
| Key Size | Restrict, Warn | 80 |
| Downgrade | Restrict, Permit, Warn | N/A |
| Location | Restrict, Permit, Warn | Street Address, City, State, Zipcode |
| Geo-location | Restrict, Permit, Warn | Latitude, Longitude |
| Password Source | Restrict, Permit, Warn | Auto, User, Application |
| Code Signing | Block, Warn | N/A |
| Certificate Issuer | Permit, Restrict, Warn | provider-1, provider-2 |
| Device Identification | Precedence | TPMID, EPID, Serial Number |
| Key Generation | Permit, Restrict, Warn | Software, TPM, TEE, SGX, SIM |
| Seal | Always, Optional | N/A |
| Trusted Domains | Permit | domain-1.com, domain-2.com |
| Certificate Management | Precedence | EST, SCEP, OCSP |
| Digital Signing | Precedence | EPID, TPM |

The location attribute in the device policy may be configured manually by an administrator, or established automatically through a location provider service based on Wi-Fi or Global Positioning System (GPS).

The Process Workflow

Applications executing on the device are compiled and linked (static or dynamic binding) to the TSP module. The applications initiate security operations though API invocations on the TSP module.

The LAA service running on the device requests a device policy from a configured remote policy server—at startup, scheduled intervals or on-demand. The received device policy is shared with the IAM module.

The TSP module queries the module to authorize (e.g. permit, restrict or warn) a security operation attempted by an application based on the received device policy.

The LAA queries the TSP module for trust measurements retrieved from the security module (e.g. platform configuration registers, digital signatures) to verify a trusted or secure boot sequence.

The LAA generates local metrics based on device operations, boot and runtime configuration settings.

A Third Party Application (TPA) is compiled and linked (static or dynamic binding) to a LAA API library module. The TPA sends indicators to the LAA service for alert generation and event logging.

The LAA sends event log messages to a configured remote device management service. The event log message includes device level trust, operational and configuration metrics, and application level indicators (warning, restricted, blocked) of activity based on the device policy.

The OT administrator may inspect the analyzed events displayed on the remote device management service console (e.g. web portal) to create or modify a device policy to alter the applications' security operations and intervene with an appropriate directive (action) to mitigate the safety incident on the remote device.

Referring to FIG. 1, at block 146 applications 112 executing on a device 100 request operations over a programming interface provided by a Trusted Services Platform (TSP) module 106. A Security Module 104 provides firmware, software, or hardware based trusted functions anchored to the root of trust on the device 100. At block 132, a Local Attestation Agent (LAA) 110 service requests a device policy 124 from a Remote Policy Management 130 service on a Policy Server 128 configured for the device 100, and securely stores the received device policy 124 on the device 100. At block 136, the TSP 106 queries the Interface Access Management 108 module to authorize 134 the operation based on the device policy 124. At block 148 the TSP 106 requests functions provided by the Security Module 104.

In an exemplary embodiment of the disclosed system, at block 138 the LAA 110 requests and receives trust metrics 116 from the TSP 106 based on trusted measurements generated by the Security Module 104. At block 140 the LAA 110 generates configuration and operational metrics 118 for the device 100.

In an exemplary embodiment of the disclosed system, at block 144 Third Party Applications 114 send indicators 120 to the LAA 110.

In an exemplary embodiment of the disclosed system at block 142 the LAA 110 sends events 122 based on the received trust metrics 138, configuration and operational metrics 118, and indicators 120 to a Remote Device Management (RDM) 126 service. Further, at block 142, the network flow path between the device 100 and the RDM service 126 may include a network firewall, security gateway, or a web proxy configured to examine all outbound network traffic and forward traffic based on a configured set of rules. The rules may include verification of message signatures and forwarding verified messages. The forwarding may optionally include a step of decrypting the received (original) message (from the device 100) to verify the message signature, and further a step of encrypting and signing the message with a new set of encryption and signing keys. Further, after the application protocol traffic has been inspected for security threats, the event log messages, originally signed by the device 100 that are forwarded to the remote device management service may be additionally signed by the network firewall, security gateway, or a web proxy. Such double signing preserves the end to end trust chain to the root of trust on the device 100.

In an exemplary embodiment of the disclosed system, the events 122 may be encrypted by the LAA 110 using a content encryption key and signed using the signer's private key. The signing may be performed on the encrypted message hash (digest) with one or more signers.

Figure 2:
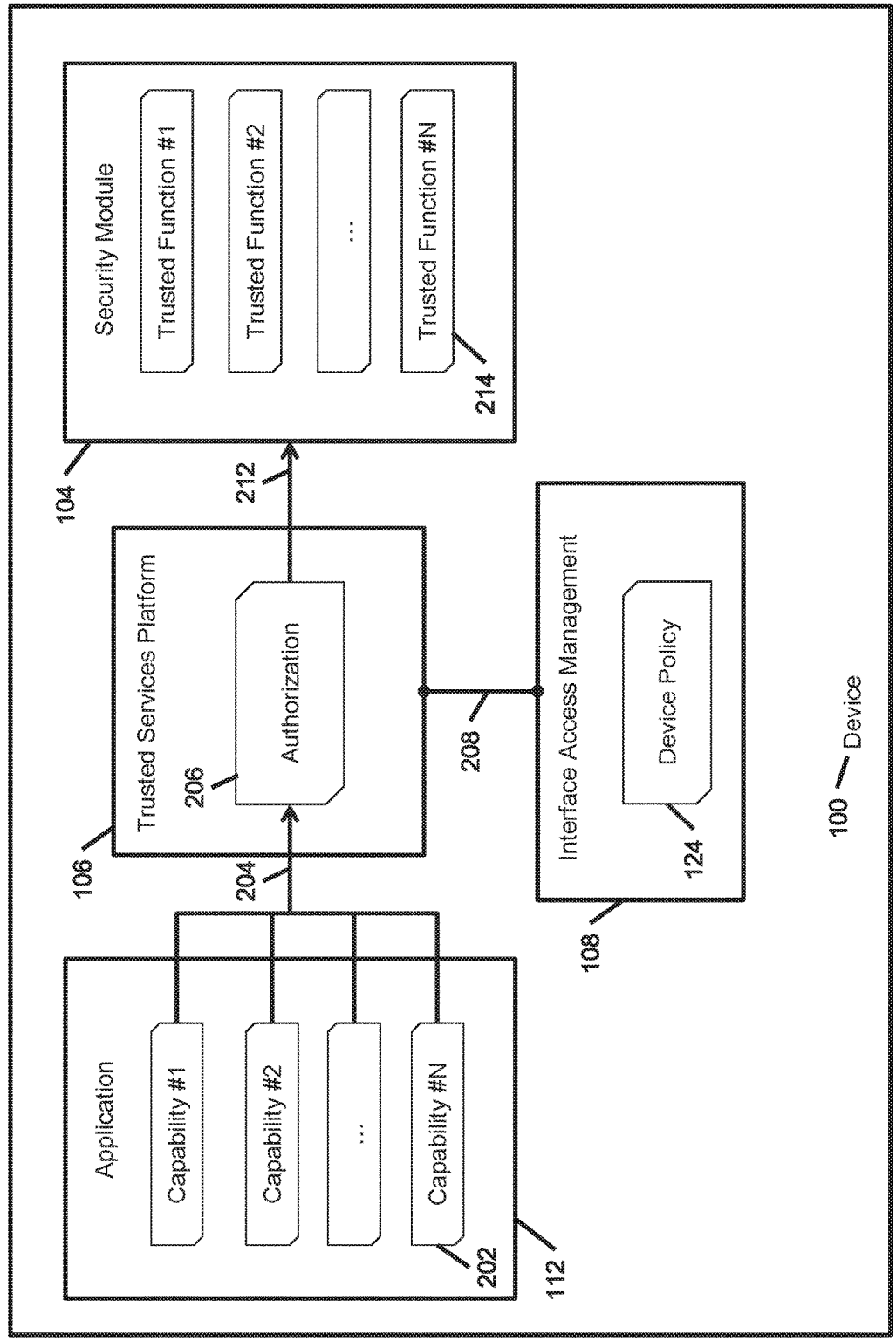
FIG. 2 is a schematic diagram illustrating interactions and control flows between components of the model in accordance with various exemplary embodiments of the disclosed system.

Referring to FIG. 2, an application 112 provides a plurality of capabilities 202, wherein a capability is associated with a set of trusted functions 214 of a security module 104 anchored to a root of trust. At block 204, the application 112 invokes an API on the TSP 106. At block 206, the TSP 106 performs an authorization step by querying 208 the IAM 108 module for a policy directive. The IAM 108 module sends the policy directive based on the device policy 124. At block 212, based on the received policy directive, the TSP 106 may issue commands to the security module 104 to execute one or more of a set of trusted functions 214.

Figure 3:
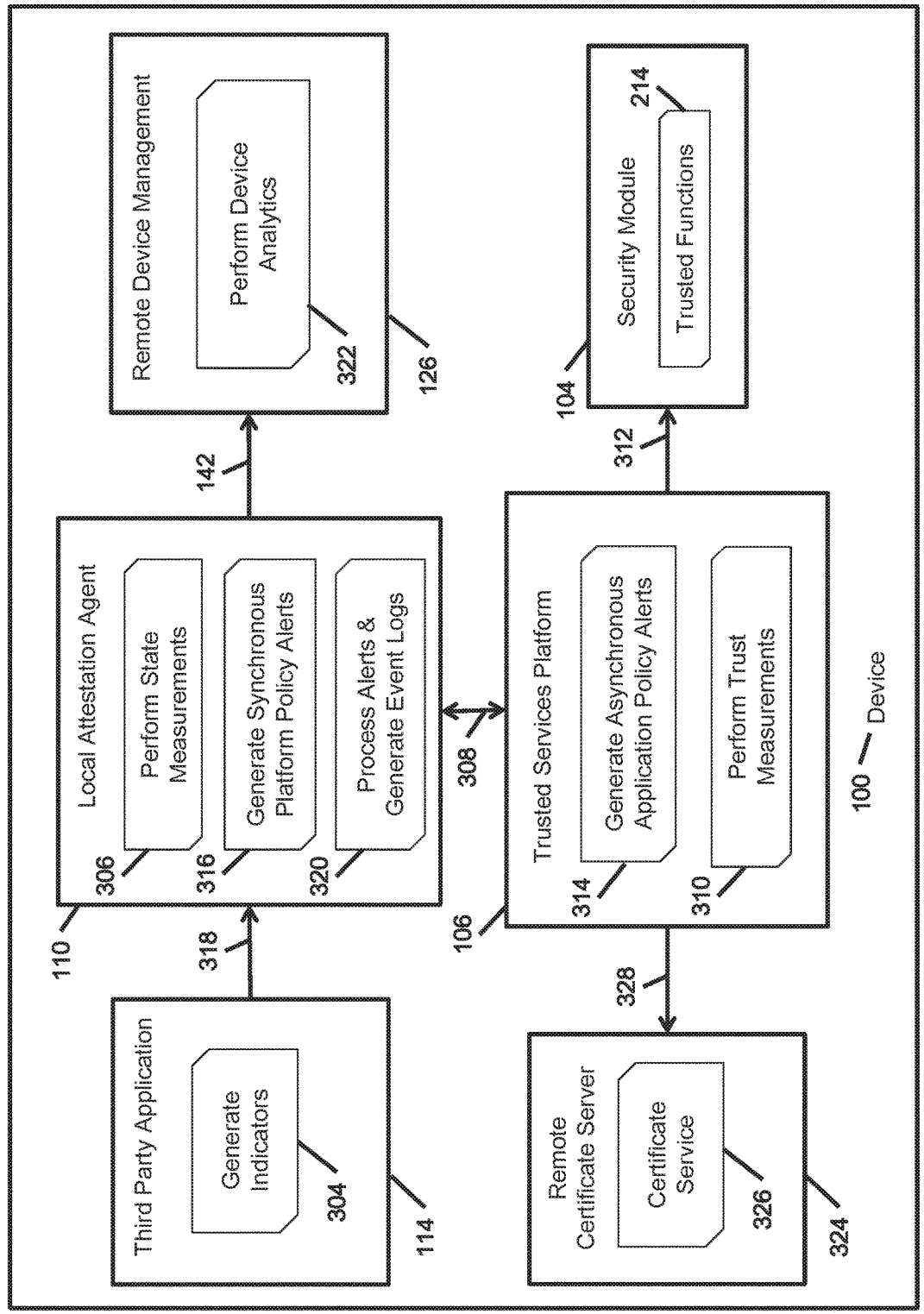
FIG. 3 is a schematic diagram illustrating a method of local attestation based on state measurements and device policy in accordance with various exemplary embodiments of the disclosed system.

Referring to FIG. 1 and FIG. 3, at block 306, the LAA 110 performs state measurements during startup, continuously at periodic scheduled intervals, or on-demand. At block 308, the LAA 110 sends a request for trust metrics to the TSP 106. At block 310, the TSP 106 performs trust measurements by issuing commands 312 to the security module 104 to provide measurements of trusted boot, such as for example, the platform configuration registers (PCR) of a TPM. At block 306, the LAA 110 performs state measurements on configuration and operational metrics leveraging platform and operating system (OS) specific APIs. At block 314, TSP 106 generates asynchronous application policy alerts based on queries 134 to the LAM 108 and the device policy 124. At block 316, the LAA 110 generates synchronous platform policy alerts based on the device policy 124. At block 318, Third Party Applications 114 generate indicators 304 (of safety threats, behavior patterns, anomalies and machine learning) and send the generated indicators (i.e. alerts) to the LAA 110 via a provider API on the LAA 110. At block 320, a policy engine of the LAA 110 processes the received alerts and generates event log messages. At block 142, the LAA 110 sends the generated event log messages to a RDM 126 service to perform device analytics 322.

Referring to FIG. 1 and FIG. 3, at block 308 the LAA 110 requests the TSP 106 to generate a signing key for the event log messages 122. At block 328, the TSP 106 sends a certificate signing request (CSR) to a certificate service 326, executing on a remote certificate server 324, for a signing key using an enrollment protocol, such as for example the Enrollment over Secure Transport (EST) protocol. The CSR may include an attested identifier of the device 100 provided by a security module 104, such as for example an END GUM or unique TPM identifier. The certificate service 326 issues a certificate for the signing key generated on the device 100 by the TSP 106 and a security module 104. The device enrollment and certificate issuance process is performed without any human intervention for scalability and automation of certifying signing keys chained to a root of trust on the device 100.

Figure 4:
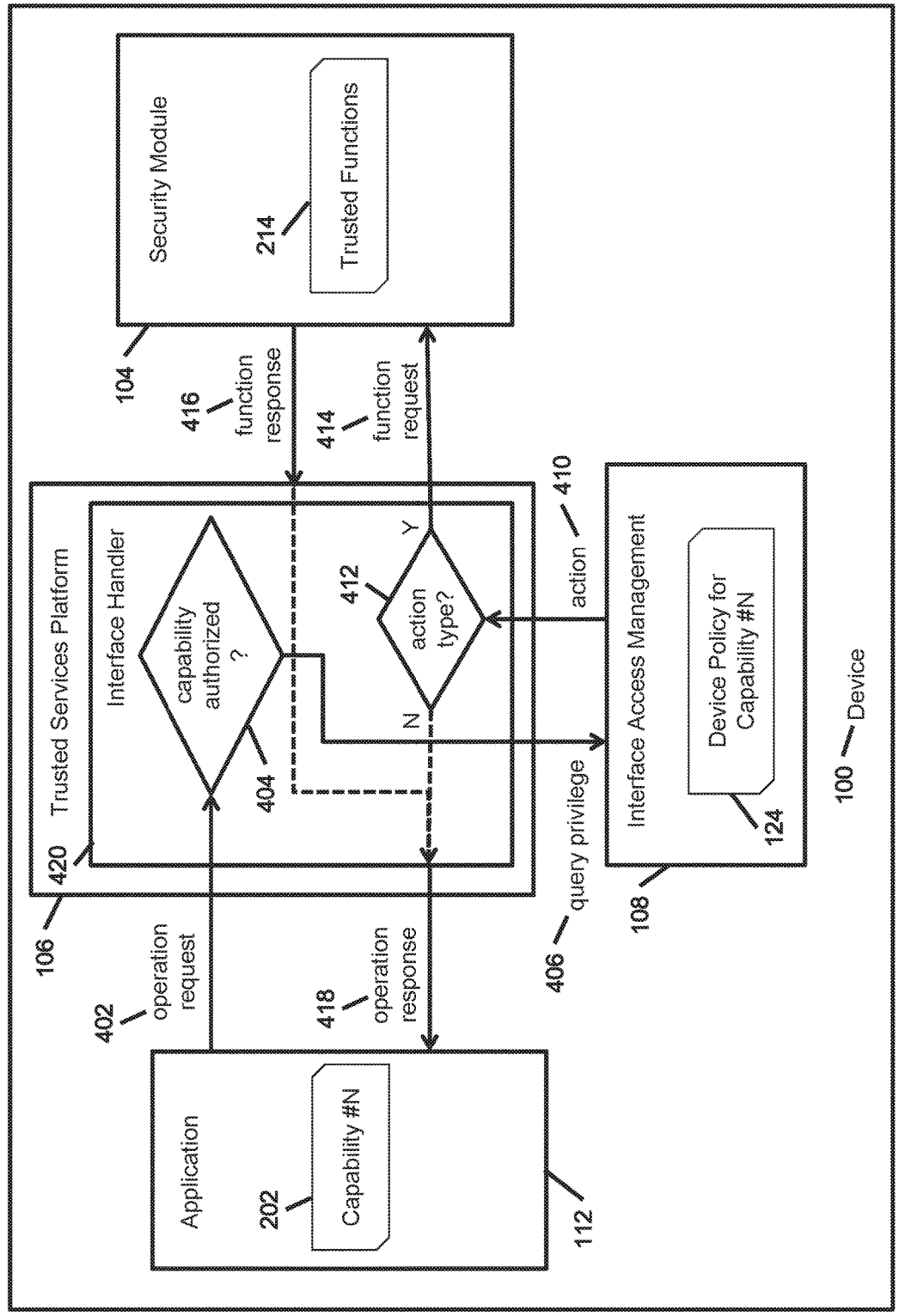
FIG. 4 is a schematic diagram illustrating a method of adaptive capability management by an interface handler of the trusted services platform in accordance with various exemplary embodiments of the disclosed system.

Referring to FIG. 4, an application 112 provides a plurality of capabilities 202, wherein a capability is associated with a security operation anchored to a security module 104 chained to the root of trust. At block 402, the application 112 sends an operation request to the TSP 106. An interface handler 420 of the TSP 106 processes the received operation request 402 to authorize the associated capability. At block 404, the interface handler 420 sends a privilege query 406 for the operation request 402 to the LAM 108. At block 410, the IAM 108 sends the action directive(s) based on the device policy 124 for the operation request 402. At block 412, the interface handler 420 receives the action directive(s) and accordingly either denies the operation request 402 with an operation response 418 to the application 112, or sends function request(s) 414 to a security module 104 to execute a set of trusted functions 312. At block 416, the security module 104 sends function response(s) to the interface handler 420. The interface handler 420 completes the operation request 402 with an operation response 418 to the application 112.

In an exemplary embodiment of the disclosed system, at block 414 the interface handler 420 may determine, based on the action directive 410, amongst a plurality of security modules 104 available on the device 100, an appropriate security module 104 to send the function request(s) to. For example, an action directive may indicate a preference of a TPM, a TEE, a SGX, a SIM or an EPID as the provider of the trusted function 312.

Figure 6:
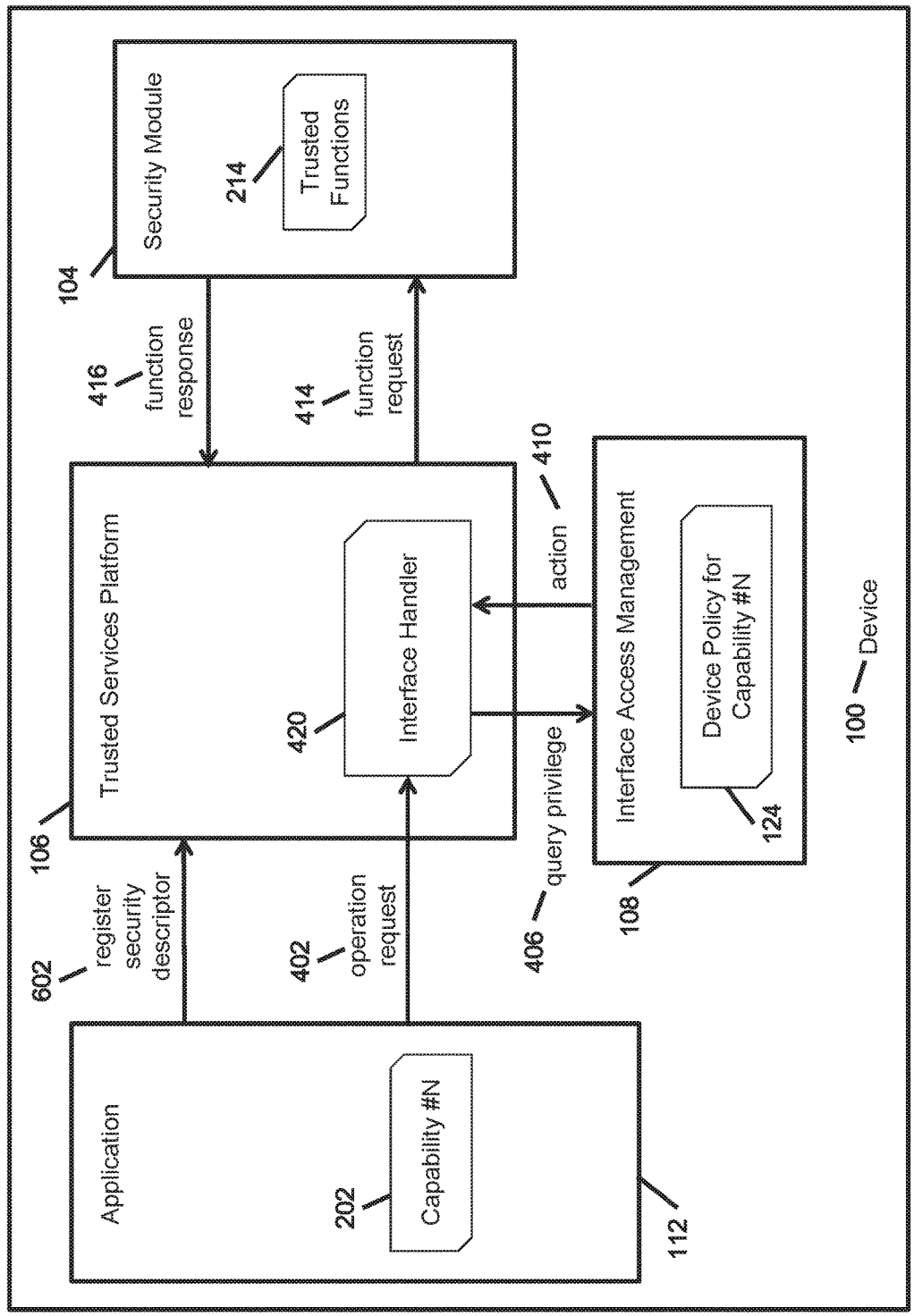
FIG. 6 is a schematic diagram illustrating a method of post authorization interface access management by the trusted services platform based on device policy in accordance with various exemplary embodiments of the disclosed system.

In an alternate exemplary embodiment of the disclosed system, referring to FIG. 4 and FIG. 6, at block 414 the interface handler 420 of the TSP 106 may determine, based on the registered security descriptor 602 by the application 112, amongst a plurality of security modules 104 available on the device 100, an appropriate security module 104 to send the function request(s) to.

Figure 5:
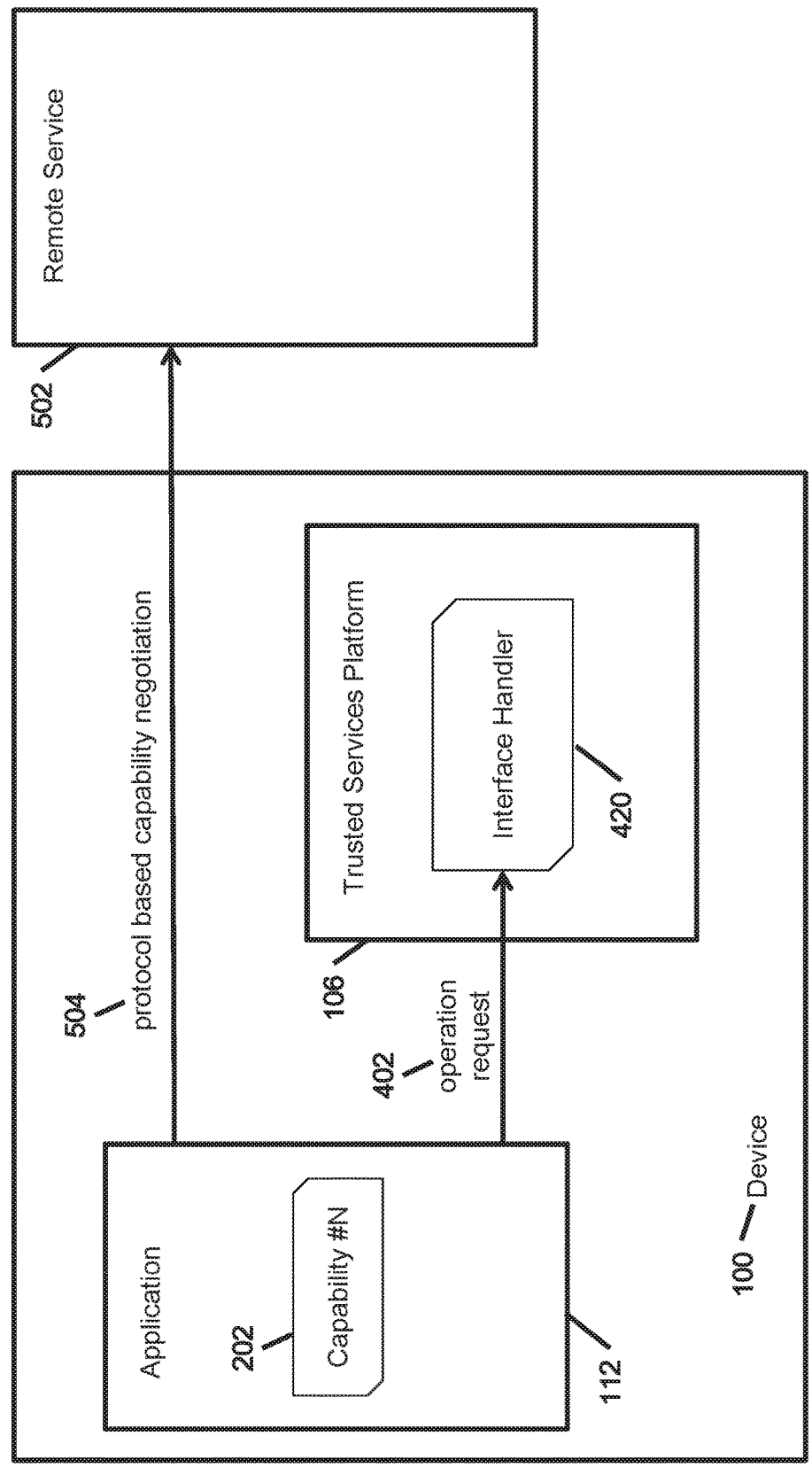
FIG. 5 is a schematic diagram illustrating interactions and control flows for protocol based capability negotiation and secure channel operations in accordance with various exemplary embodiments of the disclosed system.

Referring to FIG. 5, at block 504 the application 112 initiates a protocol based capability negotiation (e.g. Secure Socket Layer (SSL), Transport Layer Security (TLS), Secure Shell (SSH), Hypertext Transfer Protocol (HTTP) over SSL/TLS, Internet Protocol Security (IPSec), Internet Key Exchange (IKE)) with a remote service 502 to establish a session for the secure exchange of keying materials and encrypted and/or signed data. The application 112 may negotiate keying materials based on the supported capabilities 202. The remote service 502 may negotiate keying materials based on the service configuration. The application may negotiate one amongst a plurality of capabilities 202 for a session. At block 402, the protocol based capability negotiation is agnostic to the device policy 124 and the presence of an underlying TSP 106 and security module 104.

Referring to FIG. 4 and FIG. 6, at block 602 the application 112 registers a security descriptor 602 with the TSP 106. At block 412, the interface handler 420 of the TSP 106 determines, based on the registered security descriptor 602, amongst a plurality of security modules 104 available on the device 100, an appropriate security module 104 to send the function request(s) to.

Figure 7:
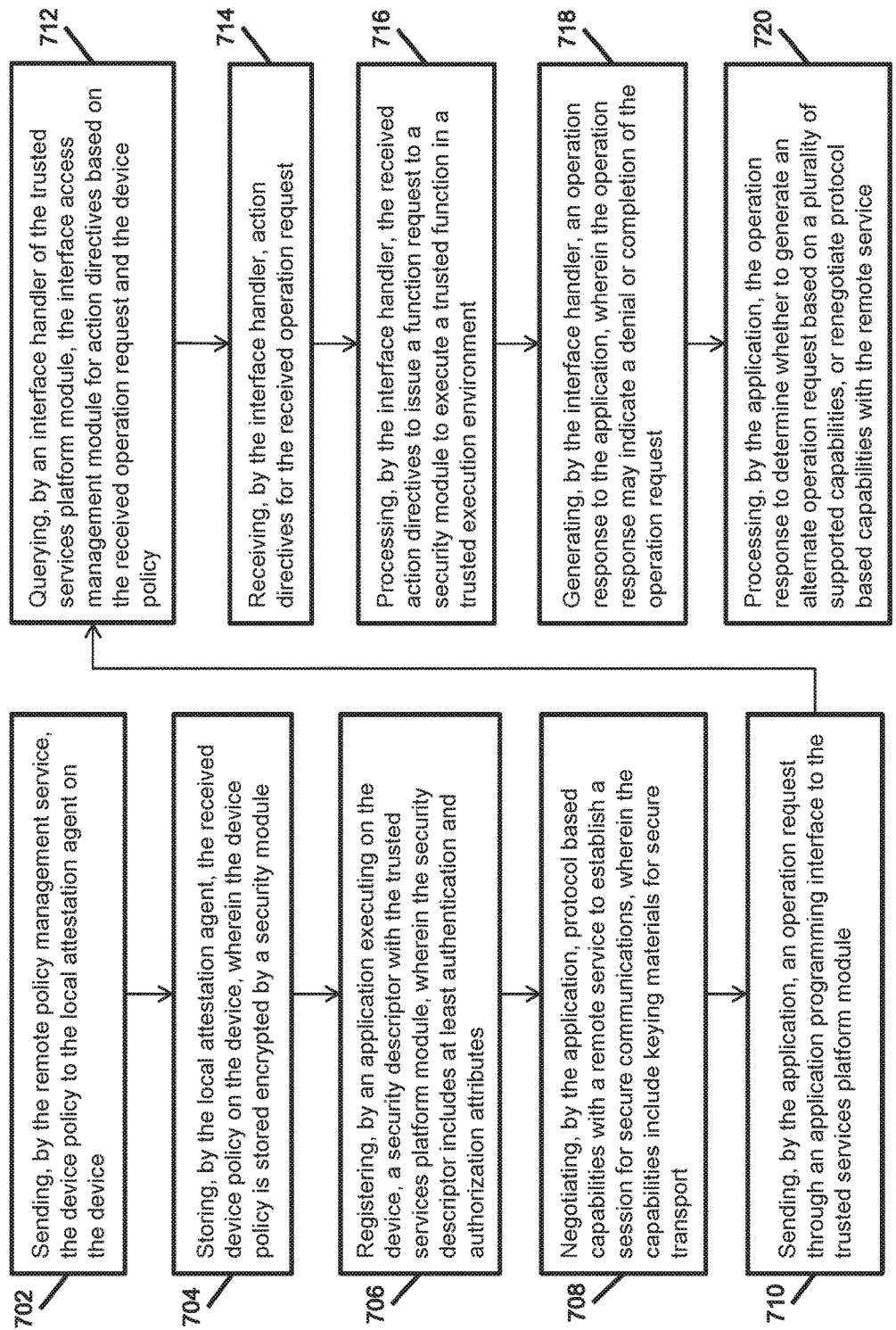
FIG. 7 is a flowchart illustrating a method of policy based adaptive application capability management in accordance with various exemplary embodiments of the disclosed system.

FIG. 7 illustrates an exemplary method of providing policy based adaptive application capability management during application programming interface invocations by an application executing on a device including a trusted services platform module, a plurality of interface handlers, a plurality of security modules, trusted functions of a security module that operate in a trusted execution environment, an interface access management module, a device policy, and a remote policy management service.

At step 702 of the method, the remote policy management service sends the device policy to the local attestation agent on the device.

At step 704 of the method, the local attestation agent stores the received device policy on the device, wherein the device policy is stored encrypted by a security module.

At step 706 of the method, an application executing on the device registers a security descriptor with the trusted services platform module, wherein the security descriptor includes at least authentication and authorization attributes.

At step 708 of the method, the application negotiates protocol based capabilities with a remote service to establish a session for secure communications, wherein the capabilities include keying materials for secure transport.

At step 710 of the method, the application sends an operation request through an application programming interface to the trusted services platform module.

At step 712 of the method, an interface handler of the trusted services platform module queries the interface access management module for action directives based on the received operation request and the device policy.

At step 714 of the method, the interface handler receives action directives for the received operation request.

At step 716 of the method, the interface handler processes the received action directives to issue a function request to a security module to execute a trusted function in a trusted execution environment.

At step 718 of the method, the interface handler generates an operation response to the application, wherein the operation response may indicate a denial or completion of the operation request.

At step 720 of the method, the application processes the operation response to determine whether to generate an alternate operation request based on a plurality of supported capabilities, or renegotiate protocol based capabilities with the remote service.

Figure 8:
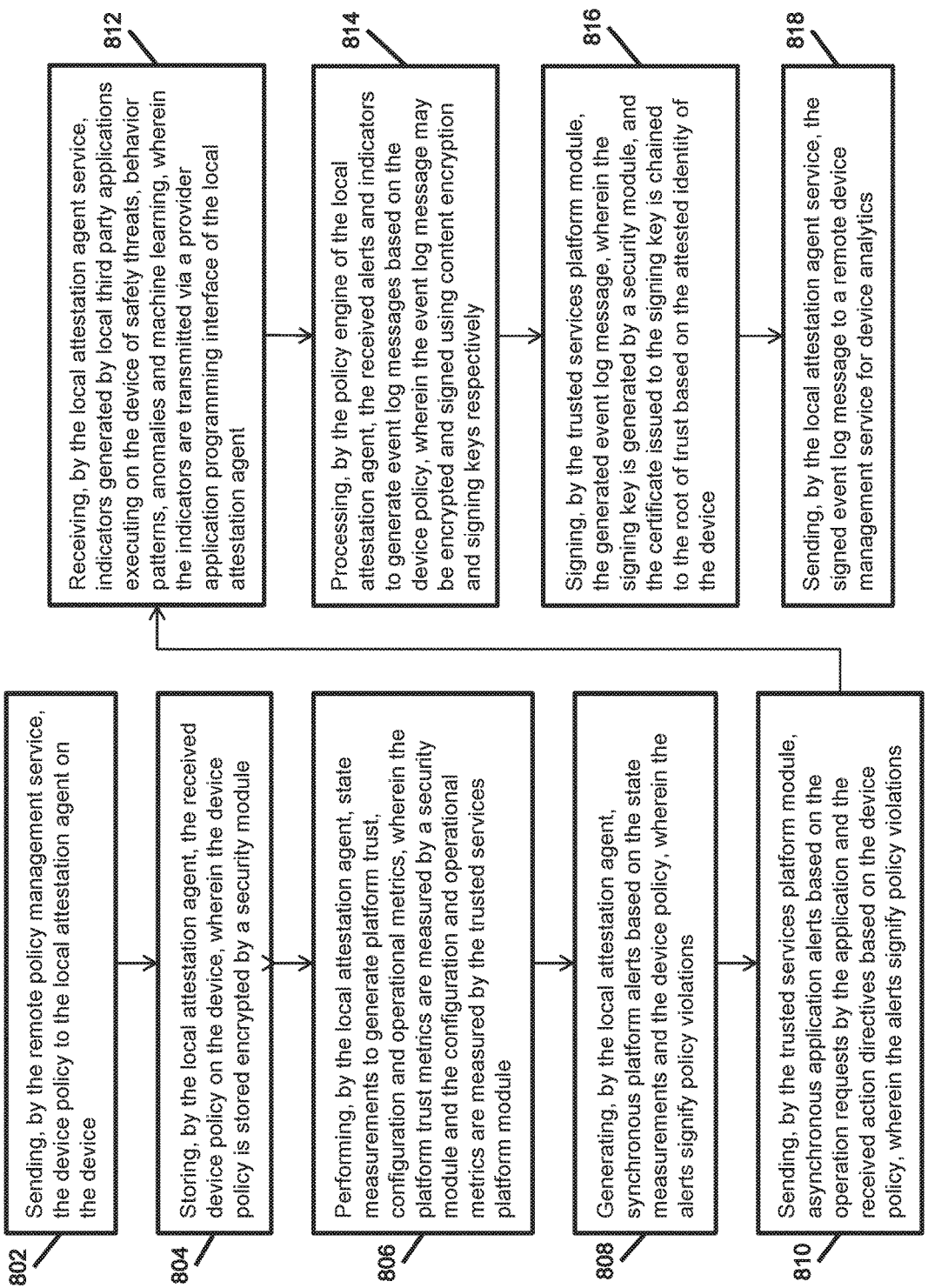
FIG. 8 is a flowchart illustrating a method of policy based device monitoring for local attestation in accordance with various exemplary embodiments of the disclosed system.

FIG. 8 illustrates an exemplary method of providing policy based local attestation and event reporting on a device including a trusted services platform module, a plurality of security modules, an interface access management module, a local attestation agent service, a device policy, a local policy engine, local third party applications, a remote policy management service, a remote device management service, and a remote certificate server.

At step 802 of the method, the remote policy management service sends the device policy to the local attestation agent on the device.

At step 804 of the method, the local attestation agent stores the received device policy on the device, wherein the device policy is stored encrypted by a security module.

At step 806 of the method, the local attestation agent performs state measurements to generate platform trust, configuration and operational metrics, wherein the platform trust metrics are measured by a security module and the configuration and operational metrics are measured by the trusted services platform module.

At step 808 of the method, the local attestation agent generates synchronous platform alerts based on the state measurements and the device policy, wherein the alerts signify policy violations.

At step 810 of the method, the trusted services platform module sends asynchronous application alerts based on the operation requests by the application and the received action directives based on the device policy, wherein the alerts signify policy violations.

At step 812 of the method, the local attestation agent service receives indicators generated by local third party applications executing on the device of safety threats, behavior patterns, anomalies and machine learning, wherein the indicators are transmitted via a provider application programming interface of the local attestation agent.

At step 814 of the method, the policy engine of the local attestation agent processes the received alerts and indicators to generate event log messages based on the device policy, wherein the event log message may be encrypted and signed using content encryption and signing keys respectively.

At step 816 of the method, the trusted services platform module signs the generated event log message, wherein the signing key is generated by a security module, and the certificate issued to the signing key is chained to the root of trust based on the attested identity of the device.

At step 818 of the method, the local attestation agent service sends the signed event log message to a remote device management service for device analytics.

In an exemplary embodiment of the disclosed system, the TSP 106 API may be provided as a static or dynamic library at build (compile and link) time, or as a Representational State Transfer (REST) API. The TSP 106 may be configured as a forwarding proxy service on the local device 100. Further, the security module 104 may be hosted on a remote device through a TSP 106 configured as a forwarding proxy service on the local device 100.

In an exemplary embodiment of the disclosed system, the device policy 124 may be directed towards a single device based on a globally unique identifier (GUID), a set of devices based on a list of GUIDs, or a group of member devices identified by a group identifier.

In an exemplary embodiment of the disclosed system the device policy 124 may be transported as enveloped data, encrypted using a secure symmetric key and signed using a Public Key Infrastructure (PKI) private key of a public-private key pair, and stored on the device encrypted by a key protected by a security module.

Figure 9:
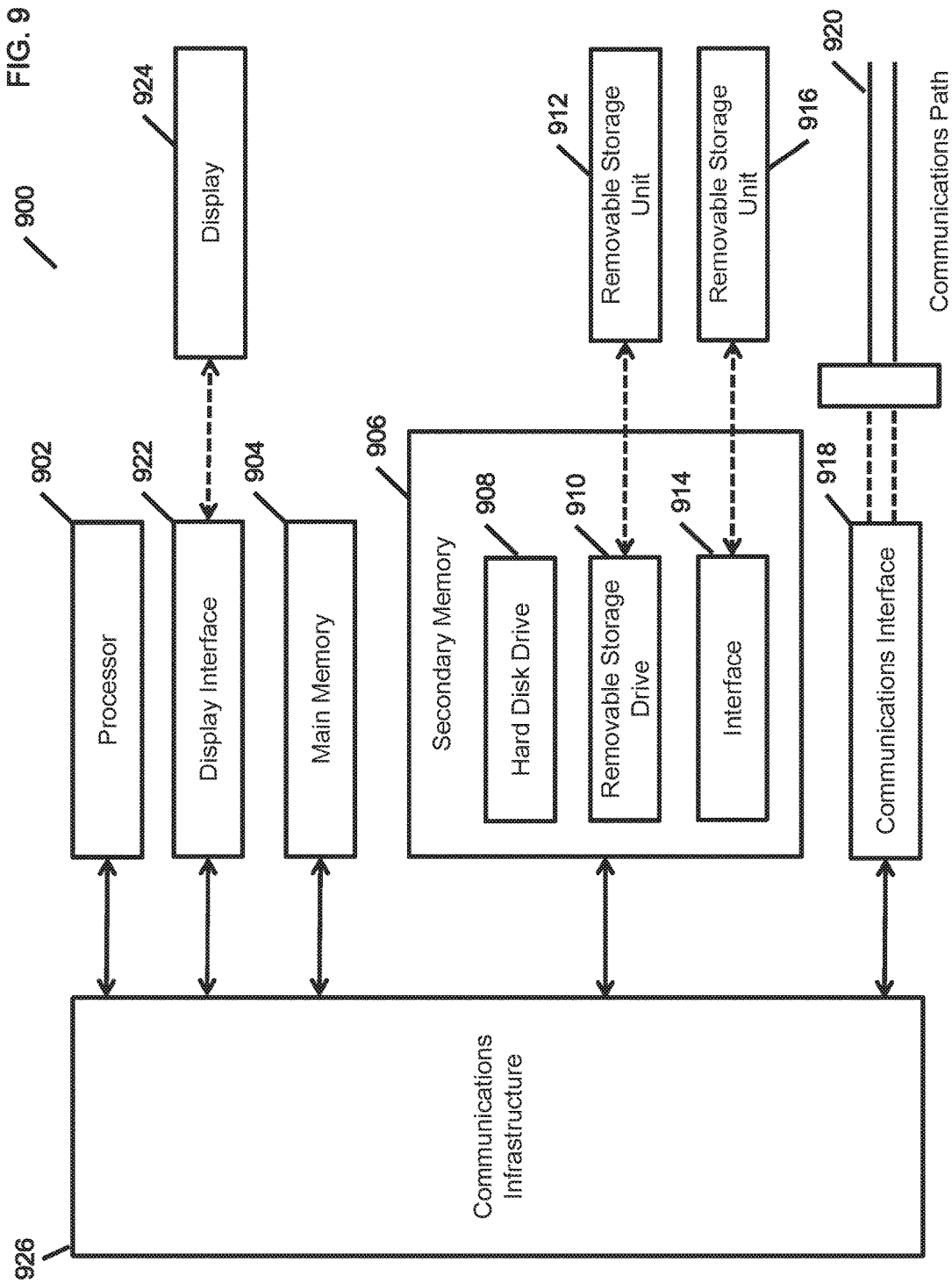
FIG. 9 is a schematic diagram of an exemplary computer system in which embodiments of the method of policy based adaptive application capability management can be implemented.

FIG. 9 illustrates an example computer system 900 in which embodiments of the present invention, or portions thereof, may be implemented as computer-readable code. For example, the network systems and architectures disclosed here can be implemented in computer system 900 using hardware, software, firmware, non-transitory computer readable media having instructions stored thereon, or a combination thereof and may be implemented in one or more computer systems or other processing systems. Hardware, software, or any combination of such may embody any of the modules and components used to implement the architectures and systems disclosed herein.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, at least one processor device and a memory may be used to implement the above-described embodiments. A processor device may be a single processor, a plurality of processors, or combinations thereof. Processor devices may have one or more processor "cores".

Various embodiments of the invention are described in terms of this example computer system 900. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 902 may be a special purpose or a general-purpose processor device. As will be appreciated by persons skilled in the relevant art, processor device 902 may also be a single processor in a multi-core/multiprocessor system, such system operating alone, or in a cluster of computing devices operating in a cluster or server farm. Processor device 902 is connected to a communication infrastructure 926, for example, a bus, message queue, network, or multi-core message-passing scheme.

The computer system 900 also includes a main memory 904, for example, random access memory (RAM), and may also include a secondary memory 906. Secondary memory 906 may include, for example, a hard disk drive 908, removable storage drive 910. Removable storage drive 910 may comprise a floppy disk drive, a magnetic tape drive, an optical disk drive, a flash memory, or the like.

The removable storage drive 910 reads from and/or writes to a removable storage unit 912 in a well-known manner. Removable storage unit 912 may comprise a floppy disk, magnetic tape, optical disk, etc. which is read by and written to by removable storage drive 910. As will be appreciated by persons skilled in the relevant art, removable storage unit 912 includes a non-transitory computer usable storage medium having stored therein computer software and/or data.

In alternative implementations, secondary memory 906 may include other similar means for allowing computer programs or other instructions to be loaded into computer system 900. Such means may include, for example, a removable storage unit 916 and an interface 914. Examples of such means may include a program cartridge and cartridge interface (such as that found in video game devices), a removable memory chip (such as an EPROM, or PROM) and associated socket, and other removable storage units 916 and interfaces 914 which allow software and data to be transferred from the removable storage unit 912 to computer system 900.

The computer system 900 may also include a communications interface 918. Communications interface 918 allows software and data to be transferred between computer system 900 and external devices. Communications interface 918 may include a modem, a network interface (such as an Ethernet card), a communications port, a PCMCIA slot and card, or the like. Software and data transferred via communications interface 918 may be in the form of signals, which may be electronic, electromagnetic, optical, or other signals capable of being received by communications interface 918. These signals may be provided to communications interface 918 via a communications path 920. Communications path 920 carries signals and may be implemented using wire or cable, fiber optics, a phone line, a cellular phone link, an RF link or other communications channels.

The computer system 900 may also include a computer display 924 and a display interface 922. According to embodiments, the display used to display the events 122 shown in FIGS. 1 and 3 described above may be the computer display 924, and the console interface may be display interface 922.

In this document, the terms "computer program medium," "non-transitory computer readable medium," and "computer usable medium" are used to generally refer to media such as removable storage unit 912, removable storage unit 916, and a hard disk installed in hard disk drive 908. Signals carried over communications path 920 can also embody the logic described herein. Computer program medium and computer usable medium can also refer to memories, such as main memory 904 and secondary memory 906, which can be memory semiconductors (e.g., DRAMs, etc.). These computer program products are means for providing software to computer system 900.

Computer programs (also called computer control logic) are stored in main memory 904 and/or secondary memory 906. Computer programs may also be received via communications interface 918. Such computer programs, when executed, enable computer system 900 to implement the present invention as discussed herein. In particular, the computer invention, such as the stages in the methods illustrated by the flowcharts in FIGS. 2-8, discussed above. Accordingly, such computer programs represent controllers of the computer system 900. Where the invention is implemented using software, the software may be stored in a computer program product and loaded into computer system 900 using removable storage drive 910, interface 914, and hard disk drive 908, or communications interface 918.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Although the invention is illustrated and described herein with reference to specific embodiments, the invention is not intended to be limited to the details shown. Rather, various modifications may be made in the details within the scope and range equivalents of the claims and without departing from the invention.

What is claimed is:

1. A method of providing policy based adaptive application capability management during application programming interface invocations by an application executing on a device, the method comprising:
    sending, by a remote policy management service, the device policy to a local attestation agent on the device;
    registering a security descriptor with the trusted services platform module, wherein the security descriptor includes at least authentication and authorization attributes;
    negotiating protocol-based capabilities with a remote service to establish a session for secure communications;
    sending an operation request through an application programming interface ("API") to the trusted services platform module;
    querying the interface access management module for action directives;
    processing, by the interface handler, the received action directives to issue a function request to a security module to execute a trusted function in a trusted execution environment;
    generating an operation response to the application, wherein the operation response indicates a denial or completion of the operation request; and
    processing the operation response to determine whether to generate an alternative operation request.

2. The method of claim 1, wherein the security module is chained to a firmware, software or hardware based root of trust and a set of trusted functions that execute in a trusted execution environment of the central processing unit or a co-processor on the device.

3. The method of claim 1, wherein the authentication attributes of the security descriptor may include proof of possession of credentials to ascertain ownership of the security module, user or service account identification, and a process identifier to verify digital code signing of the application image.

4. The method of claim 1, wherein the authorization attributes of the security descriptor may include one or more of a user account, a service account, member privileges, and a digital code signing certificate.

5. The method of claim 1, wherein the device policy may include action directives to restrict, warn, or permit with a precedence order an operation based on attributes, and further wherein an attribute may include one or more of a cipher algorithm, a key size, a key type, a hash type, a certificate type, a location, a geo-location, a certificate authority, a code signature verification, a downgrade, trusted domains, a security module preference, a seal, and a device identification preference.

6. The method of claim 1, wherein the trusted services platform may be integrated with a security module on the local device or be configured as a forwarding proxy to a trusted services platform service and security module hosted on a remote device.

7. The method of claim 1, wherein the interface handler determines a security module amongst a plurality of security modules, to execute a trusted function required to process the function request and further wherein the security module may be local or remote.

8. The method of claim 1, wherein the local attestation agent service queries the remote policy management service for the device policy at startup, continuously based on a configurable schedule, or on-demand, and further wherein the local attestation agent service subscribes for device policy update notifications and the said updates are published by the remote policy management service to the subscriber.

9. A method of providing policy-based local attestation and event reporting on a device the method comprising:
    sending the device policy to the local attestation agent on the device;
    performing state measurements to generate platform trust, configuration and operational metrics;
    generating synchronous platform alerts based on the state measurements and the device policy;
    sending asynchronous application alerts based on the operation requests by the application and the received action directives based on the device policy;
    receiving, by the local attestation agent service, indicators generated by local third party applications executing on the device of safety threats, behavior patterns, anomalies and machine learning, wherein the indicators are transmitted via a provider application programming interface of the local attestation agent;
    processing, by the policy engine of the local attestation agent, the received alerts and indicators to generate event log messages based on the device policy, wherein the event log message may be encrypted and signed using content encryption and signing keys respectively;
    signing the generated event log message; and
    sending the signed event log message to a remote device management service for device analytics.

10. The method of claim 9, wherein the security module is chained to a firmware, software or hardware based root of trust and a set of trusted functions that execute in a trusted execution environment of the central processing unit or a co-processor on the device.

11. The method of claim 9, wherein the local third party application monitors the device for safety threats, pattern recognition, anomaly detection and machine learning, and generates indicators for remote device analytics.

12. The method of claim 9, wherein the platform trust metrics include measurements for trusted boot verification by a security module.

13. The method of claim 9, wherein the event log message is digitally signed for integrity verification by the trusted services platform module via a trusted function of a security module.

14. The method of claim 9, wherein the trust metrics for state measurements may include cipher algorithms, key types, key sizes, hash types, certificate status, platform configuration registers, and trusted device identifier, and further wherein the certificate status includes one of the revocation, expiry and falsification of a certificate.

15. The method of claim 9, wherein the configuration metrics for state measurements includes one of firmware configuration, boot configuration, package signatures, non-secure interfaces, certificate types, certificate chain validation, and geo-location.

16. The method of claim 9, wherein the configuration metrics for state measurements includes one of processor utilization, memory utilization, upgrade attempts, administrative access attempts, non-secure communications, system restarts and rollback operations of firmware and application packages.

17. The method of claim 9, wherein the trusted services platform sends a certificate signing request for the signing key with the attested device identity as one of the request attributes to a remote enrollment service, and receives a certificate issued by a certificate authority, without requiring human interaction.

18. The method of claim 9, wherein a network firewall, security gateway or web proxy service deployed in the network flow path between the device and the remote device management service, verifies the event log message signature and upon successful signature verification forwards the signed event log message to the remote device management service.

19. The method of claim 18, wherein a network firewall, security gateway or web proxy service deployed in the network flow path between the device and the remote device management service, inspects the application protocol traffic for security threats and signs the signed event log messages that are forwarded to the remote device management service thereby preserving the end-to-end trust chain to the root of trust on the device.

* * * * *